United States Patent
Pampus et al.

(10) Patent No.: US 8,712,643 B2
(45) Date of Patent: Apr. 29, 2014

(54) DEVICE FOR MANEUVERING A VEHICLE USING MANEUVERING MOVES USING AT LEAST ONE TRAJECTORY

(75) Inventors: Christian Pampus, Leonberg (DE); Volker Niemz, Rutesheim (DE)

(73) Assignee: Robert Bosch GmbH, Stuttgart (DE)

(*) Notice: Subject to any disclaimer, the term of this patent is extended or adjusted under 35 U.S.C. 154(b) by 107 days.

(21) Appl. No.: 13/382,979

(22) PCT Filed: May 25, 2010

(86) PCT No.: PCT/EP2010/057138
§ 371 (c)(1),
(2), (4) Date: Mar. 29, 2012

(87) PCT Pub. No.: WO2011/009655
PCT Pub. Date: Jan. 27, 2011

(65) Prior Publication Data
US 2012/0185113 A1    Jul. 19, 2012

(30) Foreign Application Priority Data
Jul. 22, 2009  (DE) .................. 10 2009 027 941

(51) Int. Cl.
*B62D 11/00*    (2006.01)
*B62D 5/04*    (2006.01)

(52) U.S. Cl.
USPC ............................................ 701/41; 180/445

(58) Field of Classification Search
USPC .................. 701/41, 42, 43; 180/445, 446
See application file for complete search history.

(56) References Cited

U.S. PATENT DOCUMENTS

| 5,684,696 | A | 11/1997 | Rao et al. |
| 7,469,765 | B2 | 12/2008 | Spannheimer et al. |
| 2005/0021203 | A1* | 1/2005 | Iwazaki et al. .................. 701/36 |
| 2008/0077294 | A1 | 3/2008 | Danz et al. |
| 2008/0125939 | A1 | 5/2008 | Luke |
| 2008/0255728 | A1 | 10/2008 | Ottenhues et al. |
| 2010/0089677 | A1* | 4/2010 | Tanaka et al. .................. 180/204 |
| 2010/0204866 | A1* | 8/2010 | Moshchuk et al. ............. 701/25 |

FOREIGN PATENT DOCUMENTS

| DE | 19940007 | 3/2001 |
| DE | 10256770 | 6/2004 |
| DE | 102005006966 | 9/2005 |
| DE | 102007004972 | 7/2008 |
| WO | WO 2005120932 | 12/2005 |
| WO | WO 2006069976 | 7/2006 |

OTHER PUBLICATIONS

International Search Report, PCT International Application No. PCT/EP2010/057138, dated Aug. 20, 2010.
Gómez-Bravo, F. et al., "Continuous curvature path generation based on β-spline curves for parking manoeuvres," *Robotics and Autonomous Systems*, Amsterdam, NL, vol. 56, No. 4, Mar. 20, 2008, pp. 360-372.

* cited by examiner

*Primary Examiner* — Muhammad Shafi
(74) *Attorney, Agent, or Firm* — Kenyon & Kenyon LLP

(57) ABSTRACT

A device and a method for maneuvering a vehicle using maneuvering moves using at least one trajectory along which the vehicle is movable. Maneuvering moves have at least one reversing clothoid which borders on at least one trajectory and which is designed so that a steering motion of the vehicle is avoidable at standstill.

12 Claims, 1 Drawing Sheet

DEVICE FOR MANEUVERING A VEHICLE USING MANEUVERING MOVES USING AT LEAST ONE TRAJECTORY

FIELD OF THE INVENTION

The present invention relates to a device for maneuvering a vehicle using maneuvering moves having at least one trajectory, along which the vehicle is movable.

BACKGROUND INFORMATION

Conventional devices maneuver a vehicle using maneuvering moves, which term may concern forwards maneuvering moves and/or backwards maneuvering moves. The maneuvering moves include at least one trajectory, along which the vehicle is movable. The trajectories in question describe continuous paths along which the vehicle is guided. These may concern circular paths, but the trajectories are also able to deviate from basic mathematical geometries. In particular, the maneuvering moves in question may also have sections that run along a straight line. If, for instance, a vehicle is being maneuvered into a parking space, the driver may first guide the vehicle past the parking space, which may be done along a straight line or a first trajectory. A second trajectory following this first trajectory may be determined by the device in such a way that the vehicle is able to get into the parking space. The number of trajectories is not limited, in this context, and, depending on the driving situation, one, two or more trajectories may be required.

Basically there is the possibility of executing the trajectories as circular paths that are guided into one another at a stop point. If the vehicle is maneuvering on the first circular path in forward travel, when there is a reversal of the travel direction, the second circular path of the vehicle, having backwards travel, may be driven, starting from the stop point. However, this often brings up the disadvantage that the driver, during standstill in the stop point, has to make a steering motion, whereby the vehicle has to be stopped for a certain time in the stop point. The stop point may lie, for instance, in the area of oncoming traffic, so that a dangerous situation is created during the parking process. Based on the frictional grip between the tire and the road, the tires are subject to greater wear, and steering for the steering motion has to be performed using greater force, which is perceived as being less comfortable.

A method for semiautonomous steering of a vehicle parking backwards into a parking space is described in German Patent No. DE 102 56 770 A1, in which one trajectory for parking is subdivided into four curve sections, and in this context, the curve sections extend by one circular arc section or a clothoid section. At the beginning of the parking process, the vehicle may stand at any desired angle transversely to the longitudinal direction of the parking space, and, using a measuring electronics system, the position and the alignment of the vehicle relative to the parking space in the initial position is detected. The first curve section, in this context, may describe a straight line or a clothoid, it being the case that the first curve section transits smoothly into the second curve section. In the final analysis, a parking process comes about via which, between the initial position and the parked position of the parking process, the steering is controlled in such a way that the steering angle changes are continuous. This has the advantage that, during the parking process, the vehicle does not have to be stopped at the transitions between the individual curve sections, but is able to be driven without stopping from the starting position to the parked position. The use of the clothoids described, however, relates only to maneuvering moves which are defined in a continual direction of motion of the vehicle, so that between the curve moves steering motions of the vehicle are required which may possibly have to be executed by the driver.

A parking assistance is described in German Patent Application No. DE 10 2005 006 966, by which a steering torque is applied to the steering wheel of the motor vehicle, and at least one artificial steering stop is generated, so that the driver is guided by the artificial steering stop on a drive-in path for parking the vehicle. To do this, at least a subsection of the drive-in path is ascertained based on one or more polynomials. For vehicles standing far removed from the parking space, the starting point to the drive-in path is preferably selected to be in the vicinity of a deflection point, because a flat entering path brings with it a direct path and only a slight amount of driving into an oncoming traffic lane. This does, however, achieve the advantage that as great as possible a starting range for the parking process is produced, so as to avoid unnecessary steering processes. Nevertheless, the parking assistance requires steering maneuvers that are necessary between two parking moves.

SUMMARY

It is an object of the present invention to provide a device for maneuvering a vehicle which makes possible improved guidance of the vehicle during the parking process.

In accordance with an example embodiment of the present invention, the maneuvering moves include at least one reversing clothoid that borders on at least one trajectory, and that is designed in such a way that a steering motion of the vehicle is avoidable during standstill.

By the use of at least one reversing clothoid, the vehicle, bordering on at least one of the trajectories, is able to be aligned in such a way that the operation of the steering during standstill of the vehicle is able to be avoided. The reversing clothoid describes a form of a transition arc from a first curvature to an opposite, second curvature. The transition takes place at a point of maximum excursion of the reversing clothoid, at which the steering of the vehicle runs through a neutral steering angle. As a result, the alignment of the vehicle between two trajectories may be aligned in such a way that a steering motion may be avoided at standstill.

The maneuvering moves for maneuvering the vehicle having the at least one trajectory and the reversing clothoid is able to be predetermined by the device. In determination of the maneuvering moves, the device can evaluate surroundings data of the parking situation, so that, based on the available maneuvering space, the maneuvering moves are determined. The guidance of the vehicle may subsequently be taken over by the driver himself, with the device indicating or stating the trajectories and reversing clothoids to the driver. However, the possibility also exists that the vehicle is carried into effect semi-autonomously or fully autonomously by the device, in such a way that the device activates the accelerator and/or the brake pedal and/or the steering.

The maneuvering of the vehicle may include at least one stop point, in which the travel direction of the vehicle is reversible during the execution of the maneuvering moves. As a result, the stop point forms the transitional point between two maneuvering moves. In this context, it may be provided that the reversing clothoid borders on the at least one stop point.

The reversing clothoid may be situated within the maneuvering moves between the stop point and a trajectory driven through after the stop point, so that the reversing clothoid is able to be driven through between the stop point and the trajectory. After driving through a first trajectory, when the vehicle gets to the stop point, in order to reverse the direction of travel, the subsequent maneuvering move can begin with the reversing clothoid according to the present invention, in order to transit into the immediately subsequent trajectory. Ultimately, the steering must not be operated at the stop point, so that the operation of the steering has to take place only during the motion of the vehicle.

Alternatively or in addition, it may be provided that the reversing clothoid is situated within the maneuvering moves between the trajectory and the stop point that is to be reached after driving through the trajectory, so that, between the trajectory and the stop point, the reversing clothoid may be traveled through. Accordingly, the vehicle reaches the stop point after the reversing clothoid, so that the vehicle is aligned in such a way that the succeeding trajectory may be traveled without moving the steering again at a standstill.

It may be particular advantage if at least one of the trajectories is designed as a circular path, the curvature outer sides of two trajectories, that are successive during maneuvering the vehicle, pointing towards each other.

The maneuvering of the vehicle using the maneuvering moves may preferably be executed for parking the vehicle in a parking space. With regard to the direction of travel of the vehicle, from which the vehicle is approaching the parking space, the parking space may concern a transverse parking space, transverse to the direction of travel, a longitudinal parking space, longitudinal to the direction of travel or a diagonal parking space, diagonal to the direction of travel.

A first maneuvering move in this instance, including at least one trajectory and possibly a first reversing clothoid, may concern forwards travel away from the parking space, a second subsequent maneuvering move being able to refer to a trajectory and perhaps an additional reversing clothoid being able to refer to backwards travel into the parking space. However, the device is also able to calculate the maneuvering moves for maneuvering the vehicle in such a way that the vehicle is driven forwards into the parking space. If the driver first guides the vehicle past the parking space, the first maneuvering move may concern a trajectory and perhaps a reversing clothoid, on which the vehicle is moved away from the parking space in backwards travel. The following maneuvering move may include a trajectory and possibly a reversing clothoid, on which the vehicle is driven forwards into the parking space. The trajectories preferably concern circular paths, in this context.

It may be of particular advantage if the reversing clothoid is arranged in front of a trajectory via which the vehicle carries out a backwards travel. This backwards travel may concern in particular guiding the vehicle into a parking space. In this instance, reversing clothoid transits into the trajectory and preferably into the circular path in such a way that, between the end of the reversing clothoid and the beginning of the trajectory, the vehicle does not have to be stopped, moreover, during the transition, a special steering motion not being required. As a result, at the end of the reversing clothoid, the alignment of the vehicle corresponds to the alignment of the vehicle at the beginning of the following trajectory.

The present invention is also directed to a method for maneuvering of a vehicle using maneuvering moves having at least one trajectory, along which the vehicle is maneuvered, the example method including at least the step of determining at least one reversing clothoid, which borders on at least one trajectory, and the development of the reversing clothoid in such a way that a steering motion of the vehicle is avoidable during standstill. Furthermore, the example method includes the determination of maneuvering moves having a stop point between two trajectories, in which the travel direction of the vehicle is reversed during the execution of the maneuvering, the reversing clothoid being situated bordering on the stop point during the determination of the trajectories.

Moreover, the method includes a step of guiding the vehicle back to the stop point if the vehicle has been moved beyond the stop point into an overrun region. This brings about the advantage that the maneuvering moves after overrunning a stop point do not have to be calculated again, but the device directs the driver or moves the vehicle actively back to the stop point, so that subsequently the maneuvering move that has already been calculated, is able to be carried out. In particular, after the stop point, the reversing clothoid may follow, which, however, can only be started meaningfully beginning at the stop point.

Further measures improving the present invention are presented in greater detail below, together with the description of a preferred exemplary embodiment of the present invention with reference to the figures.

DETAILED DESCRIPTION OF EXAMPLE EMBODIMENTS

Figure 1:
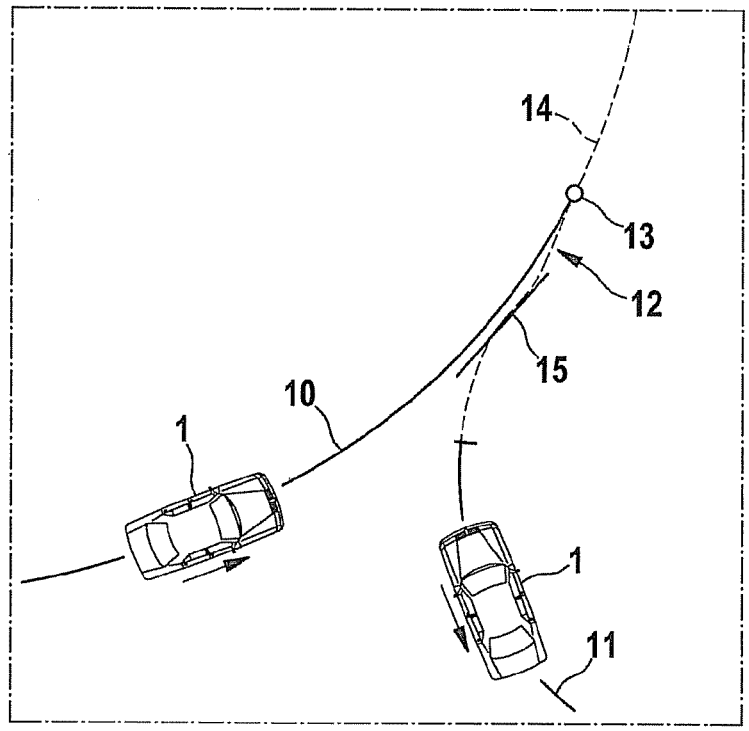
FIG. 1 shows a schematic view of the maneuvering of a vehicle using maneuvering moves, as they are able to be carried out using an example device according to the present invention.
Figure 2:
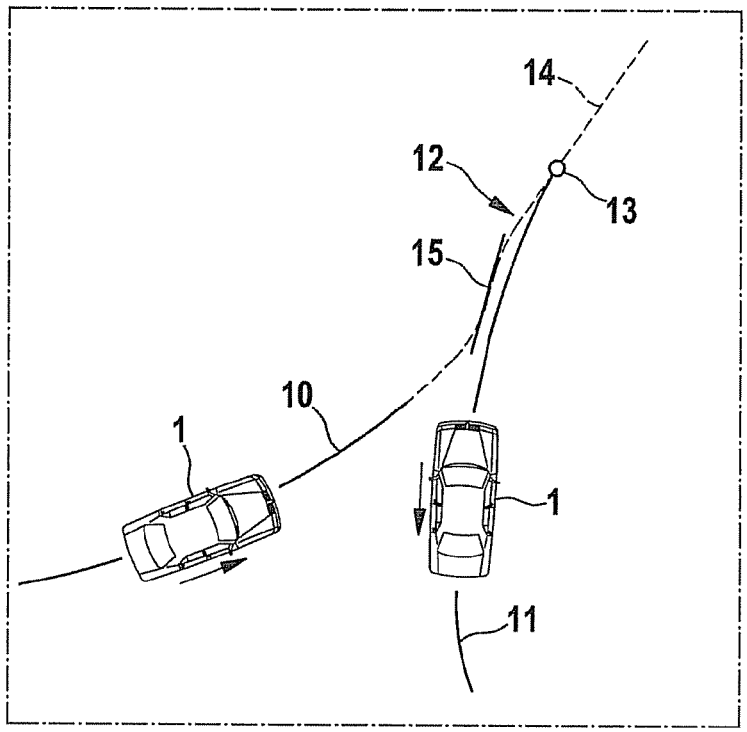
FIG. 2 shows a schematic view having an additional exemplary embodiment of possible maneuvering moves which are able to be carried out using the device according to the present invention.

FIGS. 1 and 2 show a vehicle 1, which is moving in the travel direction on a trajectory 10. Trajectory 10 is designed as a circular path. When vehicle 1 gets to stop point 13, it stops at stop point 13 and is able to reverse its travel direction. As a result, vehicle 1 is shown once more, namely on a trajectory 11, which forms an additional circular path. The outside curvatures of the circular paths point towards each other, so that the vehicle is moved over trajectory 10 using a slight left steering angle, and on trajectory 11 using a right steering angle.

Between trajectories 10 and 11 and stop point 13, a reversing clothoid 12 is provided, according to the present invention. According to FIG. 1, reversing clothoid 12 is located between stop point 13 and trajectory 11, whereas in FIG. 2, reversing clothoid 12 is situated between trajectory 10 and stop point 13.

Consequently, reversing clothoid 12 in FIG. 1 is driven through by vehicle 1 when it begins the maneuvering move which follows the maneuvering move that relates to driving through trajectory 10. Reversing clothoid 12 has a point of maximum excursion 15, there being before point of maximum excursion 15 a sub-path having a curvature in a first direction which, after point of maximum excursion 15, goes over into a sub-path which has a curvature in the opposite direction. Consequently, the steering of vehicle 1 runs through a neutral steering angle at point of maximum excursion 15.

Reversing clothoid 12 is characterized in that the steering of vehicle 1 does not have to be actuated at stop point 13. If, according to the representation, the two trajectories 10 and 11, executed as circular paths, were to meet, without reversing clothoid 12, at stop point 13, the steering of vehicle 1 would have to be operated as long as the vehicle was still in stop point 13. Maneuvering moves having trajectories 10 and 11 are known which are each already executed as reversing clothoids themselves, but this leads to a greater steering requirement, since trajectories 10 and 11, which are executed as circular paths according to the representation in FIGS. 1 and 2, need no steering motion, provided the steering of vehicle 1 maintains the required steering angle while vehicle 1 is being moved on trajectories 10 and 11.

If vehicle 1 travels beyond stop point 13 into an overrun region 14 which, for instance, may concern a continuation of trajectory 10 and the associated circular path, it is provided, according to the present invention, that the device first guides vehicle 1 back to stop point 13, so as subsequently to initiate reversing clothoid 12 according to FIG. 1. If vehicle 1 travels, according to FIG. 2, into overrun region 14, in this case too, the device will first guide vehicle 1 back to stop point 13, in order to drive into trajectory 11.

The representations in FIGS. 1 and 2 each show only one segment of the maneuvering moves of vehicle 1 during an overall maneuvering process which may, for instance, be required for parking vehicle 1 in a parking space. The parking space may be located, for example, at the end of trajectory 11, vehicle 1 driving from the left image direction via trajectory 10 into the maneuvering situation shown. The use of a reversing clothoid 12 at the end of a first trajectory 10 or at the beginning of an additional trajectory 11 may consequently be provided in multiple fashion, if a plurality of maneuvering moves is required. It should particularly be noted that, depending on the driving situation, two trajectories 10 and 11 may also meet at a stop point 13, in which case both the driving into stop point 13 and the continuation of the driving from stop point 13 is able to take place via a respective reversing clothoid 12.

The present invention is not limited in its specific embodiment to the preferred exemplary embodiment described above. Rather, a number of variants is possible which make use of the design approach shown, even for basically different types of embodiments. All of the features and/or advantages yielded, the description or the figures, including constructive details, spatial situations and method steps are able to be used to the present invention both as described and in the most varied combinations.

What is claimed is:

1. A device for maneuvering a vehicle, the device configured to cause the vehicle to move using maneuvering moves including at least one trajectory and at least one reversing clothoid that is situated between at least one of the trajectories and at least one stop point,
    wherein the at least one reversing clothoid is designed so that a steering motion of the vehicle is avoidable at standstill, and
    wherein at least one other of the trajectories is executed as a circular path on a side of the stop point opposite the at least one reversing clothoid.

2. The device as recited in claim 1, wherein the maneuvering of the vehicle includes the at least one stop point, in which the travel direction of the vehicle is reversible during execution of the maneuvering moves.

3. The device as recited in claim 2, wherein the reversing clothoid borders on the stop point.

4. The device as recited claim 2, wherein the reversing clothoid is situated between the stop point and a trajectory that is able to be traveled through after the stop point so that the reversing clothoid is able to be traveled through between the stop point and the trajectory.

5. The device as recited in claim 2, wherein the reversing clothoid is situated between a trajectory and the stop point that is to be reached after traveling through the trajectory so that between the trajectory and the stop point the reversing clothoid is able to be traveled through.

6. The device as recited in claim 1, wherein outside curvatures of two of the trajectories that are successive during maneuvering of the vehicle point to each other.

7. The device as recited in claim 1, wherein the reversing clothoid has a point of maximum excursion at which the steering of the vehicle runs through a neutral steering angle.

8. The device as recited in claim 1, wherein the maneuvering of the vehicle is carried out using the maneuvering moves for parking the vehicle in a parking space.

9. The device as recited in claim 1, wherein the reversing clothoid is arranged in front of a trajectory via which the vehicle executes a backwards drive.

10. A method for maneuvering a vehicle using maneuvering moves including at least one trajectory and at least one reversing clothoid, the method comprising:
    determining, by a device, the at least one reversing clothoid which is situated between at least one of the traiectories and at least one stop point, wherein at least one other of the traiectories is executed as a circular path on a side of the stop point opposite the at least one reversing clothoid; and
    developing, by the device, the reversing clothoid in such a way that a steering motion of the vehicle is avoidable during standstill.

11. The method as recited in claim 10, further comprising:
    determining the at least one stop point between two trajectories in which the travel direction of the vehicle is reversed during the carrying out of the maneuvering,
    wherein during the determination of the trajectories the reversing clothoid being situated bordering on the stop point.

12. The method as recited in claim 11, further comprising:
    guiding the vehicle back to the stop point when the vehicle is moved beyond the stop point into an overrun region.

* * * * *

UNITED STATES PATENT AND TRADEMARK OFFICE
CERTIFICATE OF CORRECTION

PATENT NO.         : 8,712,643 B2                                                     Page 1 of 1
APPLICATION NO.    : 13/382979
DATED              : April 29, 2014
INVENTOR(S)        : Pampus et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 174 days.

Signed and Sealed this

Twenty-ninth Day of September, 2015

Michelle K. Lee
*Director of the United States Patent and Trademark Office*